Figure 1:
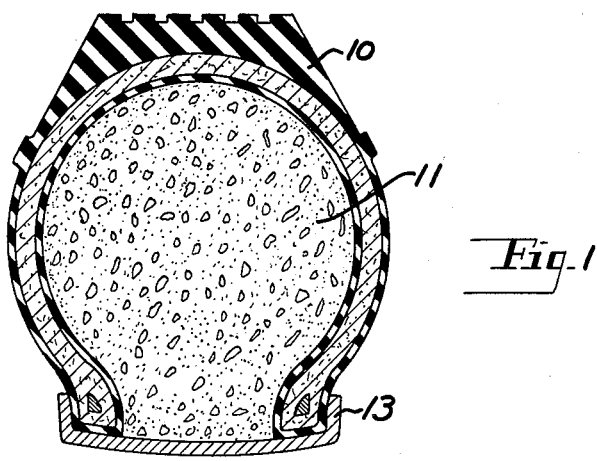

Feb. 27, 1962  D. M. LAMBE  3,022,810
DEFLATION-PROOF TIRES
Filed Aug. 3, 1960

INVENTOR.
DONALD M. LAMBE
BY
ATTORNEY 3,022,810
DEFLATION-PROOF TIRES
Donald M. Lambe, 21118 Recreation Drive,
St. Clair Shores, Mich.
Filed Aug. 3, 1960, Ser. No. 47,324
7 Claims. (Cl. 152—157)

This is a continuation-in-part application, derived from my application filed September 16, 1957, Serial No. 684,068, now abandoned.

This invention relates to improvements in pneumatic tires, by virtue of which they are made entirely deflation-proof. More specifically it refers to pneumatic tires and to methods whereby they are inflated by means of a medium comprising in whole or in part a multiplicity of minute closed cells filled with gas under pressure, suspended in a matrix comprising a resilient material such as rubber or a synthetic rubber-like polymer.

Prior art

Ever since pneumatic tires have been in use, it has been recognized that the inconvenience and danger caused by punctures is a problem of great importance. Although many efforts have been made and continue to be made toward the solution of this problem, no satisfactory solution has ever been found.

At the present time, the invention of tubeless tires, representing the expenditure of great amounts of time, effort, and money, has come closest towards solving the problem. In tubeless tires, an inner layer or liner of the tube has the capacity of flowing around a nail or other sharp object which has penetrated the tire carcass, more or less preventing the escape of air from the tire. The principal result of this invention has been the elimination of inner tubes for tires, but it has not eliminated flat tires. This has been attributed to difficulties with the liner material, such as improper adherance to the tire carcass material, tendency to become brittle and crack, etc. A great deal of effort is currently being made towards improving these liner materials, in the hope that this will eventually eliminate blowouts and flat tires, and a substantial number of patents are currently issuing in the effort to achieve a puncture proof pneumatic tire.

Prior to the present time, before any synthetic rubber-like materials were available for use as "liners" for tubeless tires, efforts of a somewhat analogous nature had also been made. In general, the object of these prior efforts was to insert something between the air in the tube and the tire wall.

For example, in 1922, Beckman, in U.S. 1,415,140, proposed the use of a "liner" between the tube and the tire casing, consisting of a leather or fabric bag filled with hollow rubber balls. The idea was that if a nail penetrated the tire casing, it would probably not penetrate entirely through the bag and into the inner tube. According to the inventor, while the bulk of this "liner" necessarily considerably reduced the size of the inner tube, it would not reduce the resiliency of the tire, because of the resiliency of the rubber balls. However, it appears extremely doubtful whether a rubber ball could withstand the difference in pressure between its interior (i.e. atmospheric pressure) and the tube pressure (say 30 p.s.i.g.). It is more likely that such a "liner" would simply collapse under tube pressure, allowing the inner tube to expand virtually to its normal extent. Certainly, a long enough nail or other sharp object would still lead to a blowout or flat tire. In any event, this type of "liner" has apparently never been found commercially useful.

In 1924, Marshall, in U.S. 1,488,998, proposed the idea of filling part of the tube with sponge rubber and the rest of the tube with air under pressure. Apparently his theory was that if there was a puncture, the sponge rubber would flow around the nail and slow the leak down. In a way, this is also similar to the present theory of tubeless tires. Oddly enough, the air in Marshall's tube was in the place most accessible to punctures, i.e., in the vicinity of the tire tread. Thus, it is very likely that before the sponge rubber could "seal" off the nail, most of the air would already have escaped. This is especially true when one takes into consideration the compressibility of sponge rubber, compressibility being defined as the fractional decrease in volume per unit increase of pressure. For sponge rubber, this has a value of about 1/lb. per sq. in. It takes only 2 or 3 pounds per square inch of pressure to compress sponge rubber to about 20% of its original volume. When it is compressed to say 30 p.s.i.g., it is completely collapsed; substantially all the air has been expelled from it, and it behaves substantially like ordinary rubber. In order words, in practice, Marshall's sponge rubber "filler" would turn out to be merely a "liner" for part of the inner wall of the tube, namely the portion closest to the rim. Thus, its practical advantages as a method of slowing down the loss of air in the event of a puncture appear to be extremely small. In any event, this method has apparently never been found commercially useful.

In 1939, Witzenmann, in U.S. 2,166,511, conceived an improvement over Marshall. He too used sponge rubber, but distributed it all around the inner wall of the tube, leaving a circular cavity in the center for air under pressure. While this places the sponge rubber in the best position for use as a "liner," it still suffers from the same disadvantage as Marshall's sponge rubber, namely that upon compression to say 30 p.s.i.g., it would collapse down to a thin "liner" covering only the inner wall of the tube. Witzenmann did not claim that his method would prevent blowouts or flat tires, but simply that it would slow down the loss of air as the air was gradually expelled from it, following a puncture. However, as pointed out above, there would actually be no air in his sponge rubber as soon as the tube was blown up to a few pounds pressure. Thus, the sponge rubber could actually have very little effect even toward slowing down the loss of air. In any event, Witzenmann's method has apparently never been found commercially useful either.

A 1923 patent by Barker, U.S. 1,470,048, suggested filling a tire with a rubber foam containing closed cells in a matrix of rubber-like material, the density of the outer portions thereof being high, and the density of the inner portions being relatively low. The closed cells were evidently not at superatmospheric pressure, as in an ordinary pneumatic tire. Such a tire is deflation-proof (like a solid rubber tire), but (like a solid tire) is unsatisfactory insofar as flexibility is concerned. In addition, it does not allow any variations in the degree of flexibility or "hardness" of the tire. Basically, it is a "cushion," rather than a pneumatic tire.

A 1928 patent by Senitha, Great Britain 288,040, also suggested the use of a rubber foam filling for a tire, containing closed cells in a matrix of rubber-like material. He also had a higher density at one portion than at another portion of the tire; in part, this was obtained by a peculiar construction of an air chamber in the tire, which was so shaped and so restrained as to exert greater pressure on one part of the foam filling than on another. His foam filling was also designed to act as a "cushion."

In the present invention, on the other hand, I utilize a filling for tires comprising a resilient foam of uniform density containing a mixture of a compressed gas and rubber-like material, the gas being entrapped under pressure in a great multiplicity of closed cells, in a matrix of rubber-like material. By regulating the relative proportion of gas to rubber-like material, I can control the compressibility of resiliency of the material, and by regulating the inherent pressure in said cells, I can regulate the minimum possible degree of inflation of the tire.

My tire filling is inherently a compressed material, that is to say, a material which exerts a hydrostatic pressure against the tire wall and has the tendency, if not restricted thereby, to expand to a greater volume. This intrinsic presusre is caused by the fact that the gas pressure in the closed cells is sufficient to overbalance the counteracting stresses induced thereby in the rubber. So far as I am aware, no tire filling has ever utilized such an "intrinsically compressed" resilient foam. Thus, Barker's resilient foam is evidently not compressed in this sense, the resiliency being due to the resiliency of the rubber, the gas bubbles being used merely to vary the density thereof at different portions thereof. While Senitha uses a resilient foam containing gas cells which may be at greater than atmospheric pressure, he does not teach the employment of gas pressures sufficient to overbalance the counteractive induced stresses in the rubber, i.e. he does not teach the use of intrinsically compressed resilient foams. On the contrary, he suggests that the resilient foam be made smaller in volume than the space it is to fill in the tire capacity; consequently, it is clear that his resilient foam is intrinsically uncompressed. Senitha's resilient foam is used in substantially the same manner as Barker's, as a cushion of non-uniform density, thus having a wide range of resiliencies. On the other hand, my intrinsically compressed closed-cell resilient foam filling for tires is of substantially uniform density, and is designed to act basically as if it were compressed air, rather than as a rubber cushion. To this end, it has an intrinsic pressure of approximately that desired, e.g. 25 p.s.i.g., and also a compressibility approximating that of air at said pressure. In order to permit adjustments in resiliency, I have also provided a method of introducing compressed air in a single discrete mass, in hydrostatic contact with the said filling; this permits minor variations in the degree of inflation of a tire, e.g. to the extent of 5 p.s.i.g. If this compressed air should be lost, through a puncture or through leakage, the tire would not go flat, but would simply ride at a predetermined degree of inflation, e.g. the equivalent of 25 p.s.i.g., which is the pressure maintained by the compressed foam filling.

Objects

An object of my invention is thus to provide a filling for, and a method of filling, pneumatic tires, which will retain its inflation for the life of the tire.

A second object of my invention is to provide a deflation-proof pneumatic tire, and a method of inflation thereof, the filling of which tire comprises an intrinsically compressed resilient foam of uniform density containing a gas and a rubber-like material, the gas being entrapped under sufficient pressure in a great multiplicity of closed cells in a matrix of rubber-like material to overbalance the counteractive stresses induced in the rubber-like material.

A third object of my invention is to provide a deflation-proof pneumatic tire of variable degree of inflation, and a method of inflation thereof, the filling of which tire comprises in the major part an intrinsically compressed resilient foam of uniform density containing a gas and a rubber-like material, the gas being entrapped under sufficient pressure in a great multiplicity of closed cells in a matrix of rubber-like material to overbalance the counteractive stresses induced in the rubber-like material, the remainder of the tire being filled with a discrete mass of air under pressure, in hydrostatic equilibrium therewith, preferably in the neighborhood of the wheel rim.

Advantages

An advantage of my invention is that it provides the resiliency of a conventional pneumatic tire, with the safety and convenience of a solid tire.

A second advantage of my invention is that it eliminates the possibility in a pneumatic tire of a blowout or of a flat tire, together with the concomitant inconvenience and danger.

A third advantage of my invention is that, by eliminating the possibility of deflation of a tire, the necessity for the purchasing and carrying of a spare tire is entirely eliminated, thus saving money and space, and permitting radical improvements in the design of new automobiles.

A fourth advantage of my invention is that it increases the useful life of a tire, by rendering the integrity of the tire sidewall less important, and making tire recapping more useful.

A fifth advantage of my invention is that, by eliminating the possibility of deflation of a tire, the necessity for purchasing and carrying, as well as the need for fumbling with a jack is eliminated.

A sixth advantage is that, although a pneumatic tire is provided which is deflation-proof, the desired degree of variability of inflation, from "soft" to a "hard" ride, is nevertheless permitted.

Other objects and advantages will more fully appear from the following description, taken in connection with the accompanying drawings, wherein are disclosed preferred embodiments of my invention.

Drawings

Figure 2:
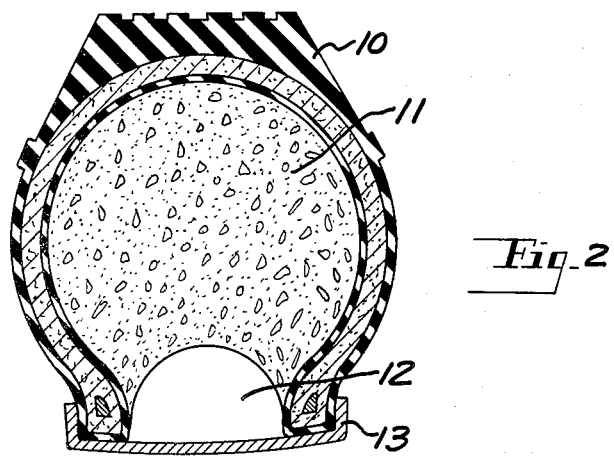

FIG. 1 is a cross-sectional view of a tire filled with resilient foam, in accordance with my invention; and FIG. 2 is a cross-sectional view of a tire partly filled with resilient foam, and partly filled with a discrete mass of compressed air, in accordance with my invention.

In the figures, like numerals refer to like parts.

Description

As shown in the figures, I may fill a pneumatic tire 10 entirely with a filling of intrinsically compressed resilient foam 11, of uniform density, or partly with such resilient foam 11 and partly with a discrete mass of compressed air 12 which is preferably in the neighborhood of the wheel rim 13. In either case, the resilient foam is preferably produced in situ, that is, directly within the tire, so that it may be confined at the desired pressure.

If I desire subsequently to add compressed air, as in FIG. 2, I place a "lubricant," such as wax on the wheel rim 13 (or on some part of the tire inner wall), to prevent the resilient foam 11 from adhering thereto. At other points, it is permitted to adhere to the tire, forming an airtight seal. At this stage, the compressed resilient foam 11 fills the entire tire, but does not adhere to the wheel rim; the appearance is therefore the same as that shown in FIG. 1. Compressed air is then admitted through a tube and valve (not shown), for example, penetrating the wheel rim 13. The pressure exerted by the resilient foam 11 on the tirewall is initially at a predetermined value of say 25 p.s.i.g.; and air is introduced up to a somewhat higher pressure, say 30 p.s.i.g. This causes the resilient foam 11 to be further compressed, as shown in FIG. 2. The air pocket 12 is well protected from loss of air by a puncturing object such as a nail; but, in any event, even if this air should be lost, the tire pressure will not decrease below the initial predetermined pressure (e.g. 25 p.s.i.g.), and the tire will therefore still be inflated, the filling then taking on the appearance shown in FIG. 1.

The resilient foam 11 contains a great multiplicity of minutes closed cells containing a gas, suspended in a matrix of rubber-like material. For example, it may be a polyurethane or polyester foam, in which carbon dioxide bubbles are evolved during the reaction producing the rubber-like polymer. (See, article by Abernathy in Rubber World, March 1955.) Alternatively, the resilient foam may be produced from natural rubber, GR-S, neoprene, acrylonitrile rubber, chlorosulfonated polyethylene, or other rubber-like materials by the addition of a "blowing agent" which liberates nitrogen, such as dinitrosopentamethylene-tetramine, sulfonyl hydrazides, or N, N'-dimethyl-N, N'-dinitrosoterephthalamide. The production of such resilient foams has been practiced extensively for the past 15 years, and is well known in the art. In most cases, open-cell structures are preferred, as very high compressibilities (of the order of magnitude of 1/p.s.i.) are thus obtained, at very low densities (1–4 lbs. per cubic foot). However, closed-cell foams may also be produced, by decreasing the relative proportion of blowing agent to rubber-like material, generally resulting in a density of 5–10 pounds per cubic foot. Furthermore, intrinsically compressed resilient foams containing pressurized gas bubbles have been produced as an intermediate stage in the production of foamed materials in high pressure molds. (See article by Fuller, in Ind. Eng. Chem., vol. 49, No. 4, p. 772 ff., April 1957.)

When low densities (e.g. 1–4 lbs. per cubic foot) are obtained, i.e. high ratios of gas to rubber-like material (about 93–98.5% gas by volume), most of the cells are open and interconnecting, and the compressibility is about the same as that of ordinary sponge rubber, i.e. of the order of magnitude of 1/p.s.i. When somewhat higher densities (e.g. 5–10 lbs. per cubic foot) are obtained, i.e. with somewhat lower ratios of gas to rubber-like material (about 85 to 92 percent gas by volume), the compressibility is greatly reduced. For example, tests on a five-inch thick piece of 7 lbs. per cubic foot polyurethane foam gave a compressibility of about 0.18/p.s.i. at atmospheric pressure. This approaches the compressibility $k$ of a gas at atmospheric pressure, which can be shown to be $$k = -\frac{1}{V}\left(\frac{\partial V}{\partial P}\right)_T = \frac{1}{P}$$

where V is the volume, P is the absolute pressure, and T is the temperature. This formula is derived in known manner from the ideal-gas law. At atmospheric pressure, $P = 14.7$ p.s.i.; $k$ is the reciprocal of this, or about 0.07 at atmospheric pressure. The compressibility of resilient foams can be controlled, largely by regulating the relative ratio of gas to rubber-like material. As this ratio is decreased, the compressibility decreases, tending towards the compressibility of a solid material, which is of the order of magnitude of $10^{-5}$/p.s.i. As the ratio is increased, the material begins to behave very much like a gas itself, insofar as its compressibility is concerned, provided most of the cells are still closed. Further increase of this ratio causes the cells to be open, in which case the compressibility greatly exceeds that of a gas, since the gas can readily be expelled by compression of the material, thus permitting the material to "fold up" like an accordion. Clearly, therefore, the compressibility of a closed-cell resilient foam can be regulated to be of a comparable order of magnitude to that of a gas, and under these conditions such a resilient foam filling in a pneumatic tire will behave substantially as if it were air. Furthermore, if the pressure of the gas contained in the closed cells of the resilient foam is sufficient to maintain the tires inflated, say to 25 p.s.i.g., said filling will behave as if there were 25 p.s.i.g. of air in the tire, with no way for it to leak out. Such a tire can run without any air, or with additions of air if desired to increase the pressure further, and can be inflated for the life of the tire (including re-cappings), and yet have substantially the same resilience as if it were full of air instead of foam. Thus, it acts as a deflation-proof pneumatic tire.

In the event it is desired to permit variations in the amount of inflation of the tire, according to the preferences of different drivers, this can readily be accomplished by the method shown in FIG. 2, and described above in connection therewith. Increasing the pressure of air in pocket 12 moves the resilient foam back an amount which is proportional to the ratio of increase in pressure of air to inherent pressure in the absence of air. That is to say, if the inherent pressure of the resilient foam is 25 p.s.i.g., and one adds compressed air up to 30 p.s.i.g., (an increase of 5 p.s.i.g.), the resilient foam will be compressed about one-fifth of its original volume (i.e. it will occupy about 80% of its original volume), assuming its compressibility to be about the same as that of air. Thus, the effect of adding air to such a tire, towards increasing the "hardness" of the ride, is about the same as in an ordinary air-filled tire. The same is true of the loss of air, except that it is impossible to lose enough air to obtain a deflated tire. It will also be observed that, by using closed-cell resilient foams having compressibilities of the same order of magnitude as that of air, there is no possibility that the foam will be squeezed out so as to constitute merely a "liner" for the tire. On the contrary, the foam will always occupy the bulk of the tire cavity, and will prevent a nail or other sharp object from causing deflation of the tire.

While it is not absolutely indispensable to the practice of my invention, it is preferable to produce said resilient foam in situ, i.e. directly in the tire, as described above. By regulating the relative proportions of gas-former to rubber-like material, the desired compressibility can be obtained; and by regulating the total amount of materials added, the intrinsic pressure of the resilient foam can be regulated. Since this is known and understood in the art, it will not be described further here.

Having thus described preferred embodiments of my invention, for the purpose of illustration, it is understood that various changes and modifications may be made without departing from the spirit and scope of the invention.

I claim:

1. A deflation-proof resilient foam filling for a pneumatic tire, comprising a multiplicity of minute individual closed cells containing a gas under pressure, said cells being suspended in a matrix of rubber-like material, the whole having substantially a uniform density throughout, the pressure of the gas contained in said cells being sufficient to cause said resilient foam filling to exert a predetermined superatmospheric pressure against its surroundings.

2. The resilient foam filling set forth in claim 1, wherein the compressibility thereof is approximately equal to that of air at the average operating pressure of said tire.

3. A deflation-proof pneumatic tire, comprising: a tire casing mounted on a wheel rim; and the resilient foam filling set forth in claim 1 contained within said tire casing and completely filling it and exerting superatmospheric pressure thereagainst.

4. A deflation-proof pneumatic tire, comprising: a tire casing mounted on a wheel rim; the resilient foam filling set forth in claim 1 contained within said tire casing and completely filling it in the absence of added compressed air and exerting superatmospheric pressure thereagainst; said resilient foam being adhered in an air-tight bond to a portion of the inner surface of said tire casing and wheel rim combination, but being non-adherent elsewhere; and means for admitting compressed air into said tire in the region of the aforementioned nonadherent surface.

5. A deflation-proof pneumatic tire, comprising: a tire casing mounted on a wheel rim; the resilient foam filling set forth in claim 1 contained within said tire casing and completely filling it in the absence of added compressed air and exerting superatmospheric pressure thereagainst; said resilient foam being adhered in an air-tight bond to a portion of the inner surface of said tire casing and wheel rim combination, but being nonadherent elsewhere; and means for admitting compressed air into said tire in the region of the aforementioned nonadherent surface; the compressibility of said resilient foam being approximately equal to that of air at the average operating pressure of said tire.

6. A deflation-proof pneumatic tire, comprising: a tire casing mounted on a wheel rim; the resilient foam filling set forth in claim 1 contained within said tire casing, adhering in an air-tight bond to a portion of the inner surface of said tire casing and wheel rim combination, and being nonadherent elsewhere; and a compressed air space contained within said tire, said compressed air being in direct contact with said nonadherent portion of said resilient foam filling and in hydrostatic equilibrium therewith.

7. A deflation-proof pneumatic tire, comprising: a tire casing mounted on a wheel rim; the resilient foam filling set forth in claim 1 contained within said tire casing, adhering in an air-tight bond to a portion of the inner surface of said tire casing and wheel rim combination, and being nonadherent elsewhere; and a compressed air space contained within said tire, said compressed air being in direct contact with said nonadherent portion of said resilient foam filling and in hydrostatic equilibrium therewith; the compressibility of said resilient foam being approximately equal to that of air at the average operating pressure of said tire.

References Cited in the file of this patent

UNITED STATES PATENTS

| | | |
|---|---|---|
| 1,369,626 | Cuttitta | Feb. 22, 1921 |
| 1,777,945 | Untiedt | Oct. 7, 1930 |
| 2,902,072 | Reuter | Sept. 1, 1959 |

FOREIGN PATENTS

| | | |
|---|---|---|
| 288,040 | Great Britain | Mar. 28, 1928 |